US012007249B2

(12) United States Patent
Liu et al.

(10) Patent No.: US 12,007,249 B2
(45) Date of Patent: Jun. 11, 2024

(54) DATA PROCESSING METHOD AND APPARATUS, VEHICLE-END DEVICE, CLOUD SERVER, AND ELECTRONIC DEVICE

(71) Applicant: Huawei Technologies Co., Ltd., Shenzhen (CN)

(72) Inventors: Jiqiu Liu, Beijing (CN); Jianqin Liu, Beijing (CN); Mingchao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/889,816

(22) Filed: Aug. 17, 2022

(65) Prior Publication Data

US 2022/0397423 A1 Dec. 15, 2022

Related U.S. Application Data

(63) Continuation of application No. PCT/CN2020/075510, filed on Feb. 17, 2020.

(51) Int. Cl.
*H04W 4/44* (2018.01)
*G01C 21/00* (2006.01)
*H04W 4/02* (2018.01)

(52) U.S. Cl.
CPC ..... *G01C 21/3885* (2020.08); *G01C 21/3833* (2020.08); *H04W 4/025* (2013.01); *H04W 4/44* (2018.02)

(58) Field of Classification Search
CPC ........... G01C 21/3885; G01C 21/3833; H04W 4/025; H04W 4/44; H04W 52/243; H04W 52/283; H04W 52/38; H04W 4/023; H04W 48/08
See application file for complete search history.

(56) References Cited

U.S. PATENT DOCUMENTS

| 10,885,780 | B1* | 1/2021 | Bseileh | G08G 1/087 |
| 2019/0116462 | A1* | 4/2019 | Sagesaka | H04W 4/44 |
| 2019/0268741 | A1 | 8/2019 | Shen et al. | |
| 2023/0084593 | A1* | 3/2023 | Hoang | H04W 72/02 |

FOREIGN PATENT DOCUMENTS

| CN | 101932059 A | 12/2010 |
| CN | 106507449 A | 3/2017 |
| CN | 106953838 A | 7/2017 |

(Continued)

*Primary Examiner* — Yonel Beaulieu
(74) *Attorney, Agent, or Firm* — Conley Rose, P.C.

(57) ABSTRACT

A data processing method includes initiating, to a cloud server, a first message used to access a roadside device or used to obtain signal transmit power-related information of static roadside equipment, receiving a second message fed back by the cloud server, where the second message is determined by the cloud server based on the first message and a prestored high-definition map, and the second message includes related information about accessing the roadside device by the vehicle-end device, or the signal transmit power-related information of the static roadside equipment, and accessing the roadside device based on the second message or determining a signal transmit power of the vehicle-end device based on the second message.

20 Claims, 7 Drawing Sheets

(56) References Cited

FOREIGN PATENT DOCUMENTS

| | | | | |
|---|---|---|---|---|
| CN | 108961751 | A | 12/2018 | |
| CN | 109754144 | A | 5/2019 | |
| CN | 109756897 | A | 5/2019 | |
| CN | 110191437 | A | 8/2019 | |
| CN | 110220516 | A | 9/2019 | |
| CN | 110570674 | A | 12/2019 | |
| EP | 3349514 | A1 | 7/2018 | |
| EP | 3349514 | A1 * | 7/2018 | ............ H04W 4/021 |
| JP | 2002236632 | A | 8/2002 | |
| JP | 2004302539 | A | 10/2004 | |
| JP | 2005072980 | A | 3/2005 | |
| JP | 2007266735 | A | 10/2007 | |
| JP | 2008227614 | A | 9/2008 | |
| JP | 2014171032 | A | 9/2014 | |
| WO | 2015054489 | A1 | 4/2015 | |
| WO | 2019013948 | A1 | 1/2019 | |
| WO | 2019158714 | A1 | 8/2019 | |
| WO | WO-2021163460 | A1 * | 8/2021 | ........ H04W 52/0225 |

* cited by examiner

DATA PROCESSING METHOD AND APPARATUS, VEHICLE-END DEVICE, CLOUD SERVER, AND ELECTRONIC DEVICE

CROSS-REFERENCE TO RELATED APPLICATIONS

This is a continuation of International Patent Application No. PCT/CN2020/075510 filed on Feb. 17, 2020, which is hereby incorporated by reference in its entirety.

TECHNICAL FIELD

The present disclosure relates to the field of autonomous driving technologies, and in particular, to a data processing method and apparatus, a vehicle-end device, an autonomous vehicle, a cloud server, an interactive system, an electronic device, and a storage medium

BACKGROUND

An autonomous vehicle is an intelligent vehicle that implements unmanned driving by using a computer system, and a roadside unit is an important participant in autonomous driving. The autonomous vehicle can access the roadside unit, and the roadside unit can provide various services for the autonomous vehicle.

In the conventional technology, a method for accessing the roadside unit by the autonomous vehicle includes that the autonomous vehicle parses a service data packet sent by the roadside unit to determine a type of services carried by the roadside unit, performs authentication on at least some of the services, and when the authentication succeeds, generates initialization information and sends the initialization information to the roadside unit, then the autonomous vehicle accesses the roadside unit, and the roadside unit provides a service corresponding to the initialization information for the autonomous vehicle.

However, the foregoing method has at least the problem that the autonomous vehicle takes relatively long time to access the roadside unit.

SUMMARY

Embodiments of the present disclosure provide a data processing method and apparatus, a vehicle-end device, an autonomous vehicle, a cloud server, an interactive system, an electronic device, and a storage medium.

According to an aspect of embodiments of the present disclosure, an embodiment of the present disclosure provides a data processing method, and the method includes initiating, to a cloud server, a first message used to access a roadside unit and/or used to obtain signal transmit power-related information of static roadside equipment, receiving a second message fed back by the cloud server, where the second message is determined by the cloud server based on the first message and a prestored high-definition map, and the second message includes related information about accessing the roadside unit by a vehicle-end device, and/or the signal transmit power-related information of the static roadside equipment, and accessing the roadside unit based on the second message, and/or determining a signal transmit power of the vehicle-end device based on the second message.

The first message may further carry an identifier of the vehicle-end device and/or location information of the vehicle-end device.

If the first message carries the location information of the vehicle-end device, a cloud device determines the second message based on the location information of the vehicle-end device and the high-definition map.

In this embodiment of the present disclosure, if the first message is a message used to access the roadside unit, the vehicle-end device may obtain, by interacting with the cloud server, the second message including the related information about accessing the roadside unit, to directly access the roadside unit based on the second message. This avoids a cumbersome verification program that needs to be performed when the vehicle-end device accesses the roadside unit in the conventional technology, to reduce time for accessing the roadside unit by the vehicle-end device.

In this embodiment of the present disclosure, if the first message is the first message used to obtain the signal transmit power-related information of the static roadside equipment, the vehicle-end device may adaptively adjust a transmit power of the vehicle-end device by interacting with the cloud server, to avoid interference to a signal of the static roadside equipment. Therefore, reliability and stability of the static roadside equipment are implemented.

In some embodiments, if the second message includes the signal transmit power-related information of the static roadside equipment, the signal transmit power-related information of the static roadside equipment includes an adjustment instruction used to adjust the signal transmit power of the vehicle-end device.

In some embodiments, the method further includes receiving the high-definition map sent by the cloud server, and adjusting the signal transmit power of the vehicle-end device based on the high-definition map.

In this embodiment of the present disclosure, the vehicle-end device may adjust the transmit power of the vehicle-end device based on the high-definition map sent by the cloud server.

In some embodiments, the adjusting the signal transmit power of the vehicle-end device based on the high-definition map includes extracting, from the high-definition map, attribute information of static roadside equipment corresponding to location information of the vehicle-end device, and adjusting the signal transmit power of the vehicle-end device based on the attribute information of the static roadside equipment.

In some embodiments, the attribute information of the static roadside equipment includes a correspondence between signal coverage and a signal transmit power. The adjusting the signal transmit power of the vehicle-end device based on the attribute information of the static roadside equipment includes, in response to a fact that the location information is in the signal coverage in the correspondence, determining, from the correspondence, a signal transmit power corresponding to the signal coverage, and adjusting the signal transmit power of the vehicle-end device based on the signal transmit power corresponding to the signal coverage.

According to another aspect of embodiments of the present disclosure, an embodiment of the present disclosure further provides a data processing method, and the method includes receiving a first message that is initiated by a vehicle-end device and that is used to access a roadside unit and/or used to obtain signal transmit power-related information of static roadside equipment, determining a second message based on the first message and a prestored high-definition map, where the second message includes related information about accessing the roadside unit by the vehicle-end device, and/or the signal transmit power-related information of the static roadside equipment, and sending the second message to the vehicle-end device, so that the vehicle-end device accesses the roadside unit based on the second message, or determines a signal transmit power of the vehicle-end device based on the second message.

In some embodiments, if the second message includes the signal transmit power-related information of the static roadside equipment, the signal transmit power-related information of the static roadside equipment includes an adjustment instruction used to adjust the signal transmit power of the vehicle-end device.

In some embodiments, if the first message includes location information of the vehicle-end device, the determining a second message based on the first message and a prestored high-definition map includes extracting, from the high-definition map, attribute information of static roadside equipment corresponding to location information of the vehicle-end device, and generating, based on the attribute information of the static roadside equipment, the second message including the adjustment instruction.

In some embodiments, the attribute information of the static roadside equipment includes a correspondence between signal coverage and a signal transmit power. The generating, based on the attribute information of the static roadside equipment, the second message including the adjustment instruction includes, in response to a fact that the location information is in the signal coverage in the correspondence, determining, from the correspondence, a signal transmit power corresponding to the signal coverage, and generating the adjustment instruction based on the signal transmit power corresponding to the signal coverage.

In some embodiments, the method includes obtaining location information of a roadside facility, and obtaining attribute information of the roadside facility, where the roadside facility includes the roadside unit and/or the static roadside equipment, and the attribute information of the roadside facility includes attribute information of the roadside unit and/or the attribute information of the static roadside equipment, and constructing the high-definition map based on the location information of the roadside facility, the attribute information of the roadside facility, and a preset vector map.

In this embodiment of the present disclosure, the high-definition map is constructed based on the location information of the roadside facility, the attribute information of the roadside facility, and the preset vector map, so that the location information of the roadside facility and the attribute information of the roadside facility are determined by using the high-definition map. In this way, a request for accessing the roadside unit by the vehicle-end device can be authenticated in advance, and the second message including the related information about accessing the roadside unit by the vehicle-end device can be generated, so that the vehicle-end device may access the roadside unit based on the related information about accessing the roadside unit. This reduces time for accessing the roadside unit by the vehicle-end device, and improves access efficiency.

Similarly, in this embodiment of the present disclosure, the high-definition map is constructed based on the location information of the roadside facility, the attribute information of the roadside facility, and the preset vector map, so that the location information of the roadside facility and the attribute information of the roadside facility are determined by using the high-definition map. In addition, the second message including the signal transmit power-related information of the static roadside equipment is generated based on the attribute information of the roadside facility, so that the vehicle-end device adaptively adjusts a transmit power of the vehicle-end device based on the second message. This avoids interference to a signal of the static roadside equipment caused by the transmit power of the vehicle-end device. Therefore, reliability and stability of the static roadside equipment are improved.

In some embodiments, the constructing the high-definition map based on the location information of the roadside facility, the attribute information of the roadside facility, and a preset vector map includes adding the roadside facility to the vector map in a form of a node based on the location information of the roadside facility, and storing the attribute information of the roadside facility as an attribute field of the node, to generate the high-definition map.

In some embodiments, the attribute information of the roadside unit includes related information about accessing the roadside unit, and the attribute information of the static roadside equipment includes the correspondence between the signal coverage and the transmit power.

In some embodiments, the obtaining location information of a roadside facility includes collecting point cloud information and/or video information corresponding to a road, and extracting the location information from the point cloud information and/or the video information, or obtain the location information by using a surveying and mapping device.

In this embodiment of the present disclosure, a plurality of methods for determining the location information are provided. For example, the location information is determined based on the point cloud information. For another example, the location information is determined based on the video information. For another example, the location information is determined by using the surveying and mapping device. The surveying and mapping device includes but is not limited to a total station.

According to another aspect of embodiments of the present disclosure, an embodiment of the present disclosure further provides a data processing apparatus, and the apparatus includes a first sending module configured to initiate, to a cloud server, a first message used to access a roadside unit and/or used to obtain signal transmit power-related information of static roadside equipment, a first receiving module configured to receive a second message fed back by the cloud server, where the second message is determined by the cloud server based on the first message and a prestored high-definition map, and the second message includes related information about accessing the roadside unit by a vehicle-end device, and/or the signal transmit power-related information of the static roadside equipment, and a first processing module configured to access the roadside unit based on the second message, and/or determine a signal transmit power of the vehicle-end device based on the second message.

In some embodiments, if the second message includes the signal transmit power-related information of the static roadside equipment, the signal transmit power-related information of the static roadside equipment includes an adjustment instruction used to adjust the signal transmit power of the vehicle-end device.

In some embodiments, the first receiving module is further configured to receive the high-definition map sent by the cloud server, and the first processing module is further configured to adjust the signal transmit power of the vehicle-end device based on the high-definition map.

In some embodiments, the first processing module is further configured to extract, from the high-definition map, attribute information of static roadside equipment corresponding to location information of the vehicle-end device, and adjust the signal transmit power of the vehicle-end device based on the attribute information of the static roadside equipment.

In some embodiments, the attribute information of the static roadside equipment includes a correspondence between signal coverage and a signal transmit power. The first processing module is configured to, in response to a fact that the location information is in the signal coverage in the correspondence, determine, from the correspondence, a signal transmit power corresponding to the signal coverage, and adjust the signal transmit power of the vehicle-end device based on the signal transmit power corresponding to the signal coverage.

According to another aspect of embodiments of the present disclosure, an embodiment of the present disclosure further provides a data processing apparatus, and the apparatus includes a second receiving module configured to receive a first message that is initiated by a vehicle-end device and that is used to access a roadside unit and/or used to obtain signal transmit power-related information of static roadside equipment, a second processing module configured to determine a second message based on the first message and a prestored high-definition map, where the second message includes related information about accessing the roadside unit by the vehicle-end device, and/or the signal transmit power-related information of the static roadside equipment, and a second sending module configured to send the second message to the vehicle-end device, so that the vehicle-end device accesses the roadside unit based on the second message, or determines a signal transmit power of the vehicle-end device based on the second message.

In some embodiments, if the second message includes the signal transmit power-related information of the static roadside equipment, the signal transmit power-related information of the static roadside equipment includes an adjustment instruction used to adjust the signal transmit power of the vehicle-end device.

In some embodiments, if the first message includes location information of the vehicle-end device, the second processing module is configured to extract, from the high-definition map, attribute information of static roadside equipment corresponding to the location information of the vehicle-end device, and generate, based on the attribute information of the static roadside equipment, the second message including the adjustment instruction.

In some embodiments, the attribute information of the static roadside equipment includes a correspondence between signal coverage and a signal transmit power. The second processing module is configured to, in response to a fact that the location information is in the signal coverage in the correspondence, determine, from the correspondence, a signal transmit power corresponding to the signal coverage, and generate an adjustment instruction based on the signal transmit power corresponding to the signal coverage.

In some embodiments, the apparatus further includes an obtaining module configured to obtain location information of a roadside facility, and obtain attribute information of the roadside facility, where the roadside facility includes the roadside unit and/or the static roadside equipment, and the attribute information of the roadside facility includes attribute information of the roadside unit and/or attribute information of the static roadside equipment, and a construction module configured to construct the high-definition map based on the location information of the roadside facility, the attribute information of the roadside facility, and a preset vector map.

In some embodiments, the construction module is further configured to add the roadside facility to the vector map in a form of a node based on the location information of the roadside facility, and store the attribute information of the roadside facility as an attribute field of the node, to generate the high-definition map.

In some embodiments, the attribute information of the roadside unit includes related information about accessing the roadside unit, and the attribute information of the static roadside equipment includes the correspondence between the signal coverage and the transmit power.

In some embodiments, the obtaining module is configured to collect point cloud information and/or video information corresponding to a road, and extract the location information from the point cloud information and/or the video information, or obtain the location information by using a surveying and mapping device.

According to another aspect of embodiments of the present disclosure, an embodiment of the present disclosure further provides a vehicle-end device. The vehicle-end device includes the apparatus according to any one of the foregoing embodiments.

According to another aspect of embodiments of the present disclosure, an embodiment of the present disclosure further provides an autonomous vehicle. The autonomous vehicle includes the vehicle-end device described in the foregoing embodiment.

According to another aspect of embodiments of the present disclosure, an embodiment of the present disclosure further provides a cloud server. The cloud server includes the apparatus according to any one of the foregoing embodiments.

According to another aspect of embodiments of the present disclosure, an embodiment of the present disclosure further provides a chip. The chip is configured to perform the method according to any one of the foregoing embodiments.

According to another aspect of the embodiments of the present disclosure, an embodiment of the present disclosure further provides a telematics box. The telematics box includes the apparatus according to any one of the foregoing embodiments.

According to another aspect of embodiments of the present disclosure, an embodiment of the present disclosure further provides an interactive system. The interactive system includes the autonomous vehicle in the foregoing embodiments and the cloud server in the foregoing embodiments.

According to another aspect of embodiments of the present disclosure, an embodiment of the present disclosure further provides an electronic device, including at least one processor, and a memory communicatively connected to the at least one processor.

The memory stores instructions that can be executed by the at least one processor, and the instructions are executed by the at least one processor, so that the at least one processor can perform the method according to any one of the foregoing embodiments.

According to another aspect of embodiments of the present disclosure, an embodiment of the present disclosure further provides a computer storage medium. The computer instructions are used to enable the computer to perform the method according to any one of the foregoing embodiments.

BRIEF DESCRIPTION OF DRAWINGS

The accompanying drawings are used for better understanding of some embodiments of the present disclosure, and do not constitute a limitation on the present disclosure.

DESCRIPTION OF EMBODIMENTS

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementations consistent with the present disclosure. On the contrary, they are only examples of apparatuses and methods that are described in the appended claims in detail and that are consistent with some aspects of the present disclosure.

Figure 1:
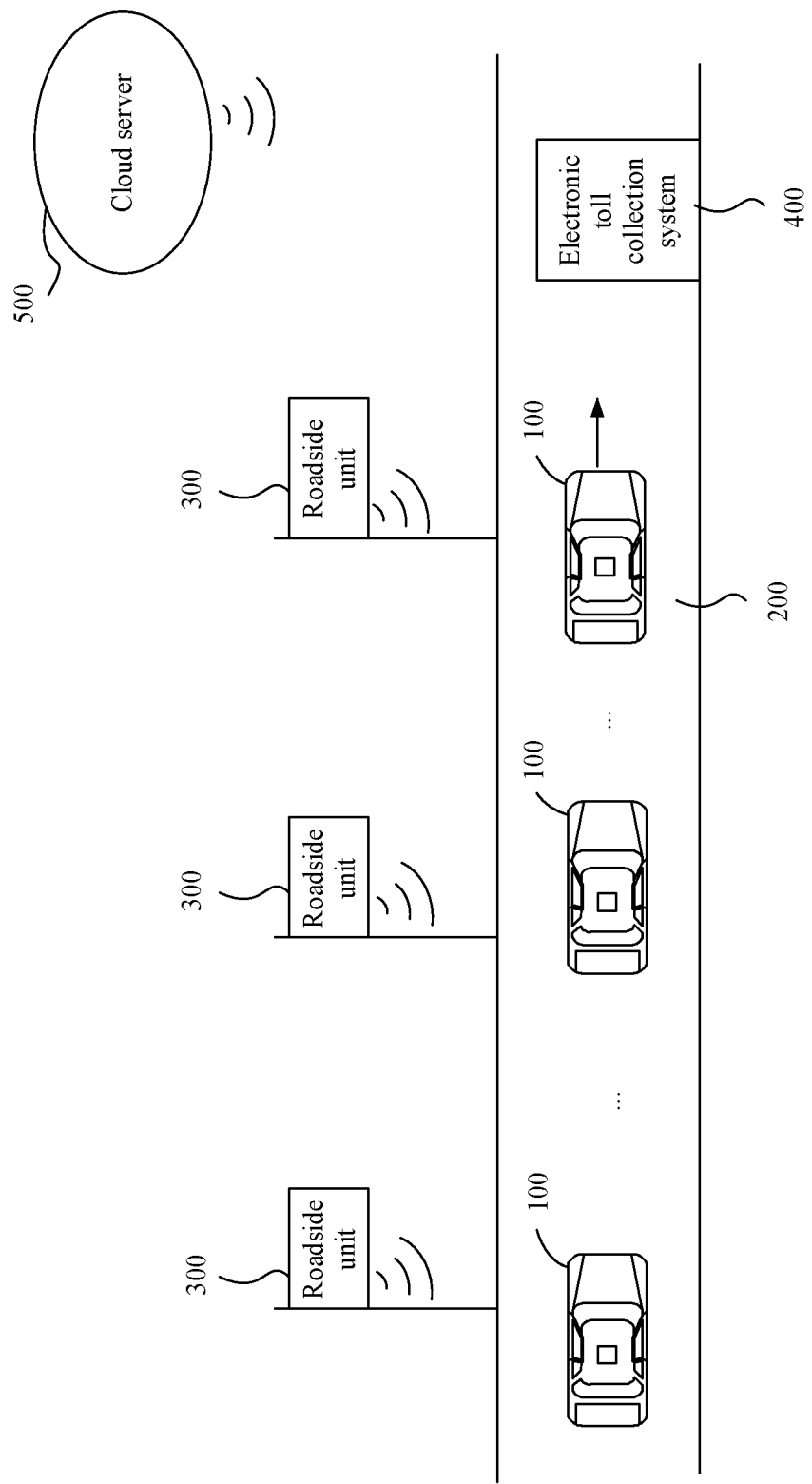
FIG. 1 is a schematic diagram of an application scenario of a data processing method according to an embodiment of the present disclosure.

FIG. 1 is a schematic diagram of an application scenario of a data processing method according to an embodiment of the present disclosure.

As shown in FIG. 1, an autonomous vehicle 100 drives on a road 200, a roadside unit 300 is disposed on a roadside of the road 200, and an electronic toll collection system 400 is further disposed on the road 200.

Each of the autonomous vehicle 100, the roadside unit 300, and the electronic toll collection system 400 can interact with a cloud server 500, and the autonomous vehicle 100 can also separately interact with the roadside unit 300 and the electronic toll collection system 400.

In the conventional technology, before the autonomous vehicle 100 accesses the roadside unit 300, a cumbersome verification process needs to be performed. After verification succeeds, the autonomous vehicle accesses the roadside unit 300, so that the roadside unit 300 provides a service for the autonomous vehicle 100.

However, in this embodiment of the present disclosure, before accessing the roadside unit 300, the autonomous vehicle 100 may interact with the cloud server 500, to obtain related information about accessing the roadside unit 300. Then, the autonomous vehicle accesses the roadside unit 300 based on the related information about accessing the roadside unit 300, to reduce access time. A specific implementation method is described in detail later.

In this embodiment of the present disclosure, the autonomous vehicle 100 can further obtain signal transmit power-related information of the electronic toll collection system 400 by interacting with the cloud server 500, so that a signal transmit power of the autonomous vehicle 100 is adaptively adjusted, to avoid impact on a signal transmit power of the electronic toll collection system 400. Therefore, reliability of the electronic toll collection system 400 is ensured. A specific implementation method is described in detail later.

The following uses specific embodiments to describe in detail the technical solutions of the present disclosure and how the foregoing technical problem is resolved by using the technical solutions of the present disclosure. The following several specific embodiments may be combined with each other, and a same or similar concept or process may not be described repeatedly in some embodiments. The following describes embodiments of the present disclosure with reference to the accompanying drawings.

According to an aspect of embodiments of the present disclosure, an embodiment of the present disclosure provides a data processing method.

Figure 2:
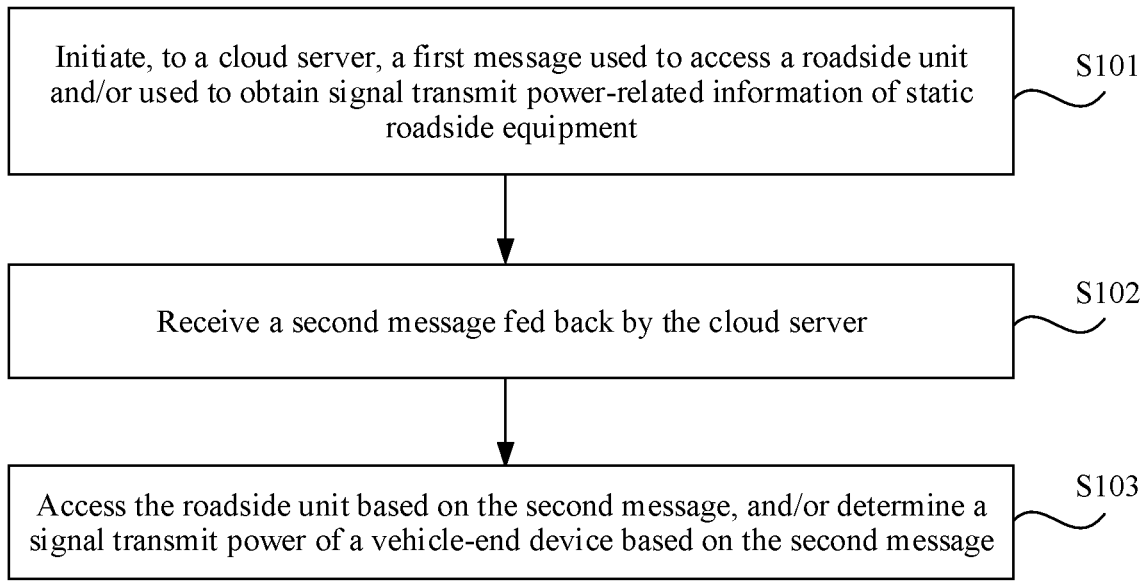
FIG. 2 is a schematic flowchart of a data processing method according to an embodiment of the present disclosure.

FIG. 2 is a schematic flowchart of a data processing method according to an embodiment of the present disclosure.

As shown in FIG. 2, the method includes the following steps.

S101: Initiate, to a cloud server, a first message used to access a roadside unit and/or used to obtain signal transmit power-related information of static roadside equipment.

This embodiment of the present disclosure may be executed by a data processing apparatus. The data processing apparatus may be a vehicle-end device disposed in an autonomous vehicle, and includes a computer, a server, a vehicle terminal, a remote information processor (vehicle-mounted telematics-box (T-BOX)), a chip (for example, an embedded chip), and the like.

In this embodiment of the present disclosure, the vehicle-end device can establish a communication link with the cloud server, and interact with the cloud server through the communication link.

The roadside unit (RSU) is an apparatus that is installed on a roadside and can interact with the autonomous vehicle (the vehicle-end device) by using a dedicated short range communication (DSRC) technology, to implement vehicle identity recognition and perform electronic point deduction.

It should be noted that in the conventional technology, the autonomous vehicle can also access the roadside unit and interact with the roadside unit. However, it can be learned from the background of embodiments of the present disclosure that in the conventional technology, before accessing the roadside unit and accessing a service provided by the roadside unit, the autonomous vehicle needs to perform a cumbersome verification process. Therefore, it takes relatively long time for the autonomous vehicle to access the roadside unit and access the service.

However, in this embodiment of the present disclosure, the autonomous vehicle (the vehicle-end device) interacts with the cloud server, so that verification is performed in advance (detailed description is provided below), to achieve a technical effect of reducing time for accessing the roadside unit and the service.

The static roadside equipment is a static device disposed on a roadside, and can transmit a signal. A transmit power of a transmit signal of the static roadside equipment may be interfered with by a transmit power of a signal of another system, for example, the electronic toll collection (ETC) system.

In this step, the vehicle-end device may send the first message to the cloud server, and the first message may be used to represent a request for accessing the roadside unit by the vehicle-end device, that is, the vehicle-end device may send the first message to the cloud server, so that the cloud server learns of a requirement of accessing the roadside unit by the vehicle-end device.

Certainly, the first message may alternatively be used to represent that the vehicle-end device obtains the signal transmit power-related information of the static roadside equipment.

Certainly, the first message may alternatively be used to represent not only a request for accessing the roadside unit by the vehicle-end device, but also the signal transmit power-related information of the static roadside equipment obtained by the vehicle-end device.

S102: Receive a second message fed back by the cloud server, where the second message is determined by the cloud server based on the first message and a prestored high-definition map, and the second message includes related information about accessing the roadside unit by the vehicle-end device, and/or the signal transmit power-related information of the static roadside equipment.

The high-definition map includes attribute information of the roadside unit and attribute information of the static roadside equipment.

In other words, after receiving the first message, the cloud server may feed the second message corresponding to the first message back to the vehicle-end device based on the first message and the high-definition map. For example, if the first message is a message used to access the roadside unit, the second message is the related information about accessing the roadside unit by the vehicle-end device, or if the first message is a message used to obtain the signal transmit power-related information of the static roadside equipment, the second message is the signal transmit power-related information of the static roadside equipment.

S103: Access the roadside unit based on the second message, and/or determine a signal transmit power of the vehicle-end device based on the second message.

In this embodiment of the present disclosure, if the second message includes the related information about accessing the roadside unit by the vehicle-end device, the vehicle-end device accesses the roadside unit based on the second message. This avoids a cumbersome verification process between the vehicle-end device and the roadside unit in the conventional technology, and reduces time for accessing the roadside unit by the vehicle-end device, so that the vehicle-end device quickly and conveniently receives a service provided by the roadside unit.

Similarly, in this embodiment of the present disclosure, if the second message includes the signal transmit power-related information of the static roadside equipment, the vehicle-end device determines the signal transmit power based on the second message, to transmit a signal by using the determined signal transmit power. Therefore, impact on a transmit power of a transmit signal of the electronic toll collection system is avoided, and stability and reliability of the electronic toll collection system are ensured.

Construction of the high-definition map is described in detail with reference to an accompanying drawing.

Figure 3:
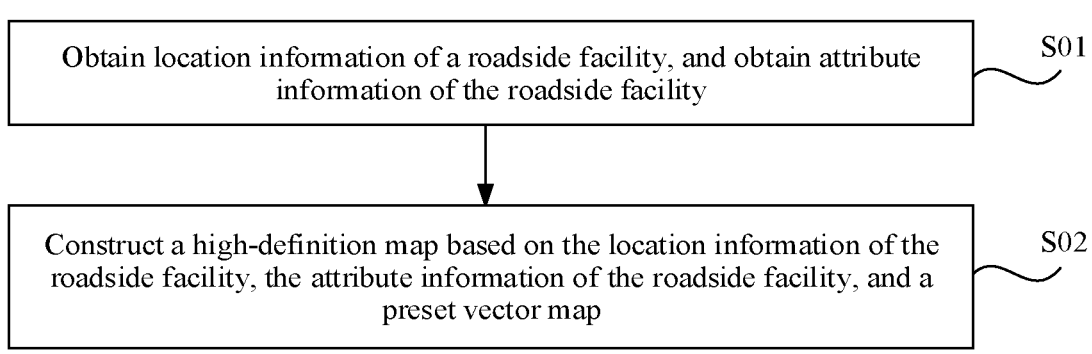
FIG. 3 is a schematic flowchart of a method for constructing a high-definition map according to an embodiment of the present disclosure.

FIG. 3 is a schematic flowchart of a method for constructing a high-definition map according to an embodiment of the present disclosure.

As shown in FIG. 3, the method for constructing a high-definition map includes the following steps.

S01: Obtain location information of a roadside facility, and obtain attribute information of the roadside facility, where the roadside facility includes a roadside unit and/or static roadside equipment, and the attribute information of the roadside facility includes attribute information of the roadside unit and/or attribute information of the static roadside equipment.

The method for constructing a high-definition map may be executed by a cloud server.

In some embodiments, that the location information of the roadside facility is obtained may include collecting point cloud information and/or video information corresponding to a road, and extracting the location information from the point cloud information and/or the video information, or obtaining the location information by using a surveying and mapping device.

In other words, in some embodiments, the point cloud information corresponding to a road may be collected, and the location information is determined based on the point cloud information, the video information corresponding to a road may be collected, and the location information is determined based on the video information, and the location information may be determined by using the surveying and mapping device. The surveying and mapping device includes but is not limited to a total station.

It should be noted that precision of the point cloud information is higher than that of the video information, and when the point cloud information is the video information, a professional surveying and mapping device is needed to obtain the location information of the roadside facility. Therefore, the point cloud information is preferably collected, to improve precision and reliability of a subsequently determined high-definition map.

Further, image collection devices configured to collect point cloud information and/or video information of an autonomous vehicle driving on a road may be disposed at an intersection of the road and/or on two sides of the road. The image collection devices may interact with the cloud server, so that the image collection device sends the collected point cloud information and/or the collected video information to the cloud server.

In some embodiments, the image collection device includes but is not limited to a radar and a camera.

The attribute information of the roadside unit is used to represent service-related information and permission-related information of the roadside unit, and includes but is not limited to a type of a service and service authentication information.

The attribute information of the static roadside equipment is used to represent a requirement on each parameter when the static roadside equipment is in a working state, and includes but is not limited to a correspondence between coverage and a transmit power. The coverage herein is used to represent signal coverage of the static roadside equipment when the static roadside equipment is in a working state.

In other words, in this step, the cloud server can determine location information of the roadside unit based on the point cloud information and/or the video information, and can also determine location information of the static roadside equipment. In addition, the cloud server can obtain the attribute information of the roadside unit, and can also obtain the attribute information of the static roadside equipment.

It should be noted that when the cloud server separately establishes a communication link with the roadside unit and the static roadside equipment (for example, a registration process may be included), the cloud server can collect the attribute information of the roadside unit and the attribute information of the static roadside unit, and store the collected attribute information of the roadside unit and the collected attribute information of the static roadside unit. In other words, the attribute information of the roadside unit and the attribute information of the static roadside equipment may be pre-stored in the cloud server.

S02: Construct the high-definition map based on the location information of the roadside facility, the attribute information of the roadside facility, and a preset vector map.

The vector map may be understood as a high-definition map in the conventional technology. In other words, the high-definition map in this embodiment of the present disclosure is created based on the high-definition map in the conventional technology. Further, the location information of the roadside facility and the attribute information of the roadside facility are added based on the high-definition map in the conventional technology.

Figure 4:
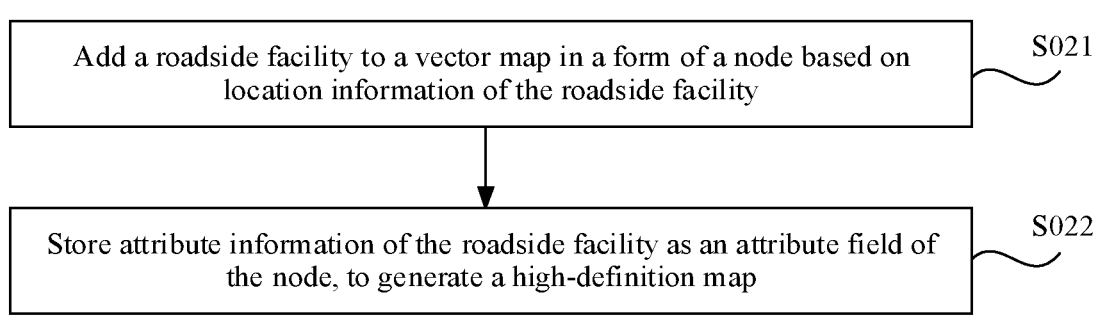
FIG. 4 is a schematic flowchart of a method for constructing a high-definition map based on location information of a roadside facility, attribute information of the roadside facility, and a preset vector map according to an embodiment of the present disclosure.

With reference to FIG. 4, it can be learned that in some embodiments, S02 includes the following.

S021: Add the roadside facility to the vector map in a form of a node based on the location information of the roadside facility.

It should be noted that after the location information of the roadside facility is determined, a location of the roadside facility in the vector map can be determined. Therefore, in this step, the roadside facility can be added to the vector map based on the location information of the roadside facility, and the roadside facility is a node in the vector map.

Certainly, in some embodiments, a type may be further set for each node, to distinguish between roadside facilities (for example, a roadside unit and static roadside equipment) of different types.

S022: Store the attribute information of the roadside facility as an attribute field of the node, to generate the high-definition map.

This step may further include setting an attribute field for each node (namely, each roadside facility), and filling the attribute information of the roadside facility in the attribute field, to obtain the high-definition map.

With reference to the accompanying drawings, the following describes a data processing method when a roadside facility includes a roadside unit and a vehicle-end device accesses the roadside unit.

Figure 5:
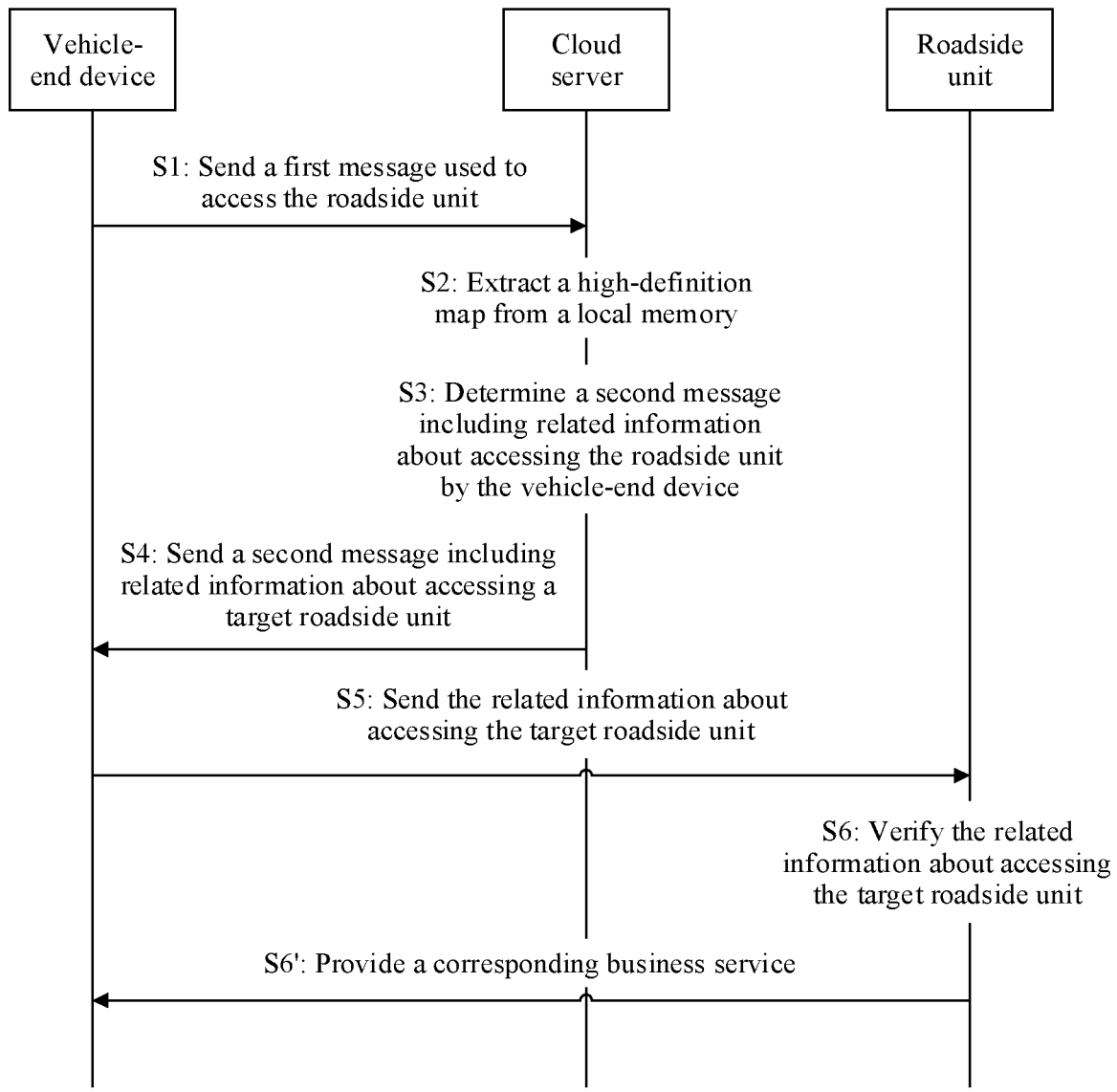
FIG. 5 is a schematic interaction diagram of a data processing method according to an embodiment of the present disclosure.

FIG. 5 is a schematic interaction diagram of a data processing method according to an embodiment of the present disclosure.

As shown in FIG. 5, the method includes the following steps.

S1: A vehicle-end device sends, to a cloud server, a first message used to access a roadside unit.

S2: The cloud server extracts a high-definition map from a local memory.

For a method for constructing a high-definition map, refer to the foregoing example. Details are not described herein again.

S3: The cloud server extracts attribute information of the roadside unit from the high-definition map, and determines, based on the attribute information of the roadside unit, a second message including related information about accessing the roadside unit by the vehicle-end device.

The related information about accessing the roadside unit is used to represent a credential for accessing the roadside unit by the vehicle-end device, and the vehicle-end device may access the roadside unit based on the related information about accessing the roadside unit.

That the cloud server determines, based on the attribute information of the roadside unit, the related information about accessing the roadside unit by the vehicle-end device may be implemented by using the following method.

After receiving the first message, the cloud server may obtain an identifier and a location of the vehicle-end device. The cloud server determines, based on the identifier of the vehicle-end device, a type of a service (namely, a type of a service purchased by the vehicle-end device) that can be obtained by the vehicle-end device from the roadside unit, and the cloud server may determine, from the high-definition map based on the location of the vehicle-end device, a roadside unit (referred to as a target roadside unit below) that can be accessed by the vehicle-end device.

The cloud server extracts attribute information of the target roadside unit from the high-definition map, namely, a type of a service and service authentication information of the target roadside unit.

The cloud server verifies access permission of the vehicle-end device based on the service authentication information. That is, the cloud server verifies, based on the service authentication information, that the vehicle-end device can access the target roadside unit. If verification succeeds, the related information about accessing the target roadside unit by the vehicle-end device is generated, or if verification fails, a procedure ends.

The identifier of the vehicle-end device may be device code of the vehicle-end device, a license plate of an autonomous vehicle, and the like. The identifier of the vehicle-end device may be carried in the first message, and location information of the vehicle-end device may also be carried in the first message, so that the location information of the vehicle-end device is reported to the cloud server.

S4: The cloud server sends, to the vehicle-end device, the second message including the related information about accessing the target roadside unit by the vehicle-end device.

S5: The vehicle-end device sends, to the target roadside unit, the related information about accessing the target roadside unit by the vehicle-end device.

S6: The target roadside unit verifies the related information about accessing the target roadside unit by the vehicle-end device, after verification succeeds, the target roadside unit is accessed by the vehicle-end device, and provides a corresponding service for the vehicle-end device (S6' shown in FIG. 5).

It should be noted that although this step also includes verification, the verification in this step is only specific to the related information about accessing the target roadside unit by the vehicle-end device. This may be understood as verifying reliability of the related information about accessing the target roadside unit by the vehicle-end device, that is, verifying whether the related information is sent by the cloud server. If the related information is sent by the cloud server, direct access by the vehicle-end device is allowed, and a corresponding service is provided for the vehicle-end device, to improve access reliability.

Certainly, when the target roadside unit receives the related information that is sent by the vehicle-end device and that is about accessing the target roadside unit by the vehicle-end device, the target roadside unit may allow direct access by the vehicle-end device, and provide a corresponding service for the vehicle-end device.

It should be noted that in the conventional technology, after the vehicle-end device directly sends, to the roadside unit, a request for accessing the roadside unit, and the roadside unit performs a series of verification, the vehicle-end device may access the roadside unit and accept the service provided by the roadside unit. However, because a verification process is relatively cumbersome, it takes relatively long time for the vehicle-end device to access the roadside unit.

However, in this embodiment of the present disclosure, the vehicle-end device may interact with the cloud server in advance based on a known requirement of accessing the roadside unit by the vehicle-end device, so that the vehicle-end device directly accesses the roadside unit subsequently. This is equivalent to that the cloud server verifies, in advance, a request for accessing the roadside unit by the vehicle-end device, which reduces time for accessing the roadside unit by the vehicle-end device.

The cloud server and the vehicle-end device can interact with each other through fourth generation (4G) and fifth generation (5G), and the vehicle-end device and the roadside unit can interact with each other through vehicle-to-everything (V2X) information exchange.

With reference to the accompanying drawings, the following describes a data processing method used when a roadside facility includes static roadside equipment and a vehicle-end device obtains signal transmit power-related information of the static roadside equipment.

Figure 6:
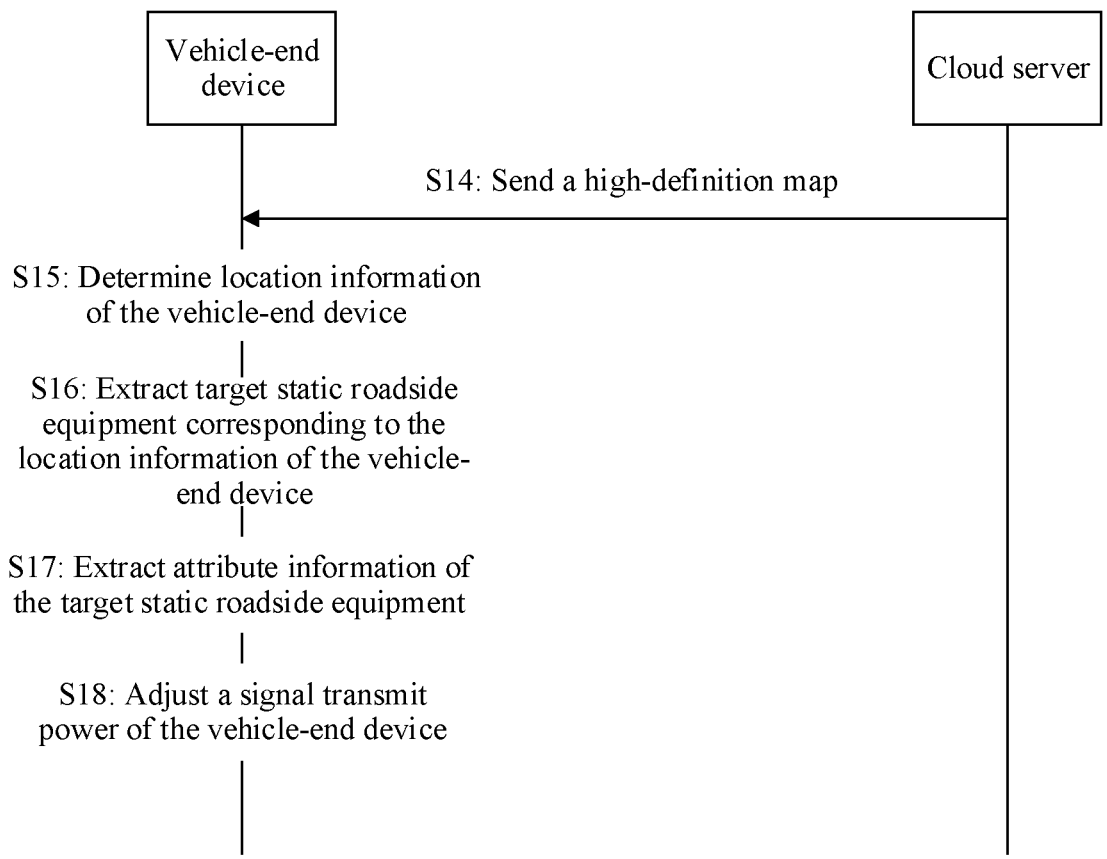
FIG. 6 is a schematic interaction diagram of a data processing method according to an embodiment of the present disclosure.

In some embodiments, FIG. 6 is a schematic interaction diagram of a data processing method according to an embodiment of the present disclosure.

As shown in FIG. 6, the method includes the following steps.

S7: A vehicle-end device sends, to a cloud server, a first message used to obtain signal transmit power-related information of static roadside equipment.

S8: The cloud server extracts a high-definition map from a local memory.

For a method for constructing a high-definition map, refer to the foregoing example. Details are not described herein again.

S9: The cloud server determines location information of the vehicle-end device.

The location information of the vehicle-end device may be carried in the first message. For example, when sending the first message to the cloud server, the vehicle-end device may carry the location information of the vehicle-end device in the first message.

S10: The cloud server extracts attribute information of a target static roadside unit from the high-definition map based on the location information of the vehicle-end device.

S11: The cloud server generates, based on the attribute information of the target static roadside unit, a second message including the signal transmit power-related information of the static roadside equipment, where the signal transmit power-related information of the static roadside equipment includes an adjustment instruction used to adjust transmit power of the vehicle-end device.

It should be noted that the high-definition map stores attribute information of static roadside units at different locations. In addition, when a distance between the vehicle-end device and a static roadside unit is greater than a threshold, the vehicle-end device does not affect a signal transmit power of the static roadside unit. Therefore, the target static roadside unit is used to represent a static roadside unit whose signal transmit power may be affected by the vehicle-end device. Therefore, in this step, the cloud server selects, from the high-definition map based on the location information of the vehicle-end device, the static roadside unit whose signal transmit power may be affected by the vehicle-end device, and marks the static road side unit as the target static road side unit.

Attribute information of the static roadside equipment includes a correspondence between signal coverage and a signal transmit power. Therefore, this step may further include the following. The cloud server determines whether a location corresponding to the location information of the vehicle-end device is within the signal coverage. If the location corresponding to the location information of the vehicle-end device is within the signal coverage, the cloud server extracts, from the high-definition map, a static roadside unit whose location corresponding to the location information of the vehicle-end device is within the signal coverage, marks the static roadside unit as the target static roadside unit, and extracts attribute information of the target static roadside unit.

S12: The cloud server sends, to the vehicle-end device, a second message including the signal transmit power-related information of the static roadside equipment.

S13: The vehicle-end device adjusts a signal transmit power of the vehicle-end device based on the second message, namely, the adjustment instruction.

In some embodiments, the adjustment instruction may be used to instruct the vehicle-end device to decrease the signal transmit power of the vehicle-end device, and may carry a signal transmit power corresponding to the coverage, so that the vehicle-end device adjusts the signal transmit power of the vehicle-end device to a value less than the signal transmit power corresponding to the coverage.

Certainly, in some other embodiments, the adjustment instruction may be further used to represent an adjusted value of the signal transmit power of the vehicle-end device, so that the vehicle-end device adjusts a current signal transmit power of the vehicle-end device to an adjusted value corresponding to the adjustment instruction.

Figure 7:
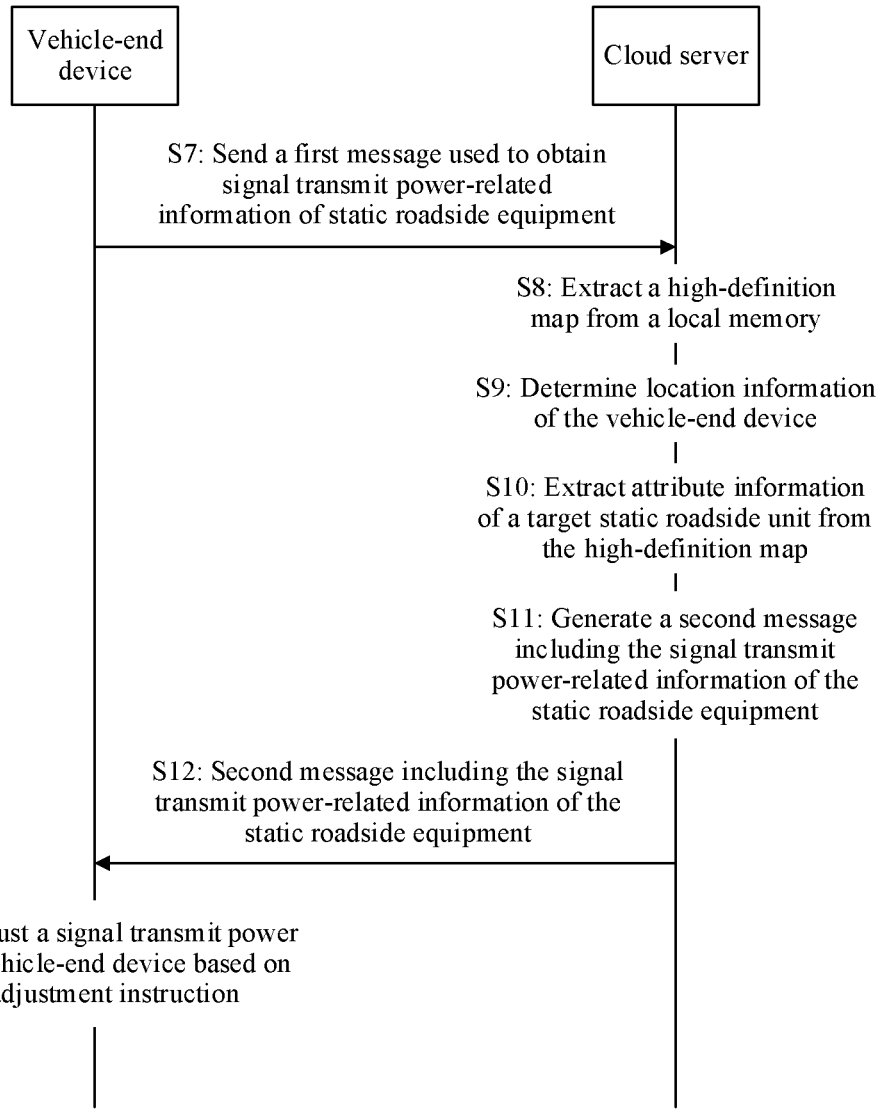
FIG. 7 is a schematic interaction diagram of a data processing method according to an embodiment of the present disclosure.

In some embodiments, FIG. 7 is a schematic interaction diagram of a data processing method according to an embodiment of the present disclosure.

As shown in FIG. 7, the method includes the following steps.

S14: When a vehicle-end device accesses a cloud server, the cloud server sends a high-definition map to the vehicle-end device.

The vehicle-end device may access the cloud server by using a method in an existing technical solution. Details are not described herein.

In some embodiments, in this step, the cloud server may monitor access by the vehicle-end device. When the vehicle-end device is monitored to access the cloud server, the cloud server sends the high-definition map to the vehicle-end device.

In some embodiments, that the cloud server sends the high-definition map to the vehicle-end device may further include the following.

The cloud server may directly send the high-definition map to the vehicle-end device.

Alternatively, the cloud server selects a part of the high-definition map corresponding to location information of the vehicle-end device, and sends the part of the high-definition map to the vehicle-end device. In addition, the part of the high-definition map corresponding to the location information of the vehicle-end device is used to represent, in the high-definition map, a part of the high-definition map in which location corresponding to the location information of the vehicle-end device is within a preset range. That is, the part of the high-definition map may be a part of the high-definition map that is selected within a preset radius range by using a location of the vehicle-end device in the high-definition map as an origin, and certainly, the part of the high-definition map may alternatively be a part of the high-definition map that is selected within a preset radius range from the high-definition map by using a location of the vehicle-end device in the high-definition map as a start point and by using a driving direction of the autonomous vehicle as a selection direction.

Alternatively, the cloud server obtains the location information of the vehicle-end device. However, it can be learned from the foregoing example that the location information of the vehicle-end device may be obtained in at least two manners. For details, refer to the foregoing example. For details about selecting the part of the high-definition map based on the location information of the vehicle-end device, refer to the foregoing example. Details are not described herein again.

In other words, in this step, the high-definition map sent by the cloud server to the vehicle device may be at least one part of the high-definition map.

S15: The vehicle-end device positions a location of the vehicle-end device, to obtain the location information of the vehicle-end device. That is, the vehicle-end device obtains the location information of the vehicle-end device in a positioning manner.

The positioning manner may be implemented through a radar or a Global Positioning System (GPS). For a specific positioning manner, refer to the conventional technology. Details are not described herein.

S16: The vehicle-end device extracts target static roadside equipment corresponding to the location information of the vehicle-end device.

This step may further include determining, based on the location information of the vehicle-end device and the high-definition map, whether there is static roadside equipment affected by a signal transmit power of the vehicle-end device, if there is the static roadside equipment affected by the signal transmit power of the vehicle-end device, extracting the static roadside equipment, and marking the static roadside equipment as the target static roadside equipment.

S17: The vehicle-end device extracts attribute information of the target static roadside equipment.

The attribute information of the target static roadside equipment includes a correspondence between signal coverage and a signal transmit power.

S18: The vehicle-end device adjusts the signal transmit power of the vehicle-end device based on a signal transmit power corresponding to the signal coverage.

In this step, after determining a signal transmit power of the target static roadside equipment, the vehicle-end device adjusts the signal transmit power of the vehicle-end device based on the signal transmit power of the target static roadside equipment. For example, the signal transmit power of the vehicle-end device is reduced, to avoid interference caused by the vehicle-end device to the signal transmit power of the target static roadside equipment as much as possible, and to further improve stability and reliability of the target static roadside equipment.

According to another aspect of embodiments of the present disclosure, an embodiment of the present disclosure further provides a data processing apparatus.

Figure 8:
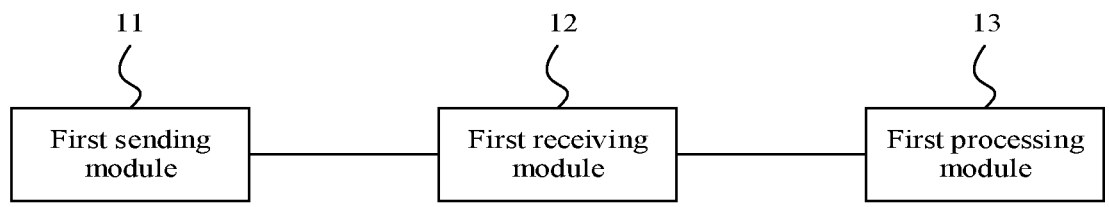
FIG. 8 is a block diagram of a data processing apparatus according to an embodiment of the present disclosure.

FIG. 8 is a block diagram of a data processing apparatus according to an embodiment of the present disclosure.

As shown in FIG. 8, the data processing apparatus includes a first sending module 11 configured to initiate, to a cloud server, a first message used to access a roadside unit and/or used to obtain signal transmit power-related information of static roadside equipment, a first receiving module 12 configured to receive a second message fed back by the cloud server, where the second message is determined by the cloud server based on the first message and a prestored high-definition map, and the second message includes related information about accessing the roadside unit by the vehicle-end device, and/or the signal transmit power-related information of the static roadside equipment, and a first processing module 13 configured to access the roadside unit based on the second message, and/or determine a signal transmit power of the vehicle-end device based on the second message.

In some embodiments, if the second message includes the signal transmit power-related information of the static roadside equipment, the signal transmit power-related information of the static roadside equipment includes an adjustment instruction used to adjust the signal transmit power of the vehicle-end device.

In some embodiments, the first receiving module 12 is further configured to receive the high-definition map sent by the cloud server.

The first processing module 13 is further configured to adjust the signal transmit power of the vehicle-end device based on the high-definition map.

In some embodiments, the first processing module 13 is further configured to extract, from the high-definition map, attribute information of static roadside equipment corresponding to location information of the vehicle-end device, and adjust the signal transmit power of the vehicle-end device based on the attribute information of the static roadside equipment.

In some embodiments, the attribute information of the static roadside equipment includes a correspondence between signal coverage and a signal transmit power. The first processing module 13 is configured to, in response to a fact that the location information is in the signal coverage in the correspondence, determine, from the correspondence, a signal transmit power corresponding to the signal coverage, and adjust the signal transmit power of the vehicle-end device based on the signal transmit power corresponding to the signal coverage.

According to another aspect of embodiments of the present disclosure, an embodiment of the present disclosure further provides a vehicle-end device. The vehicle-end device includes the apparatus described in any one of the foregoing embodiments.

According to another aspect of embodiments of the present disclosure, an embodiment of the present disclosure further provides an autonomous vehicle. The autonomous vehicle includes the vehicle-end device in the foregoing embodiment.

Figure 9:
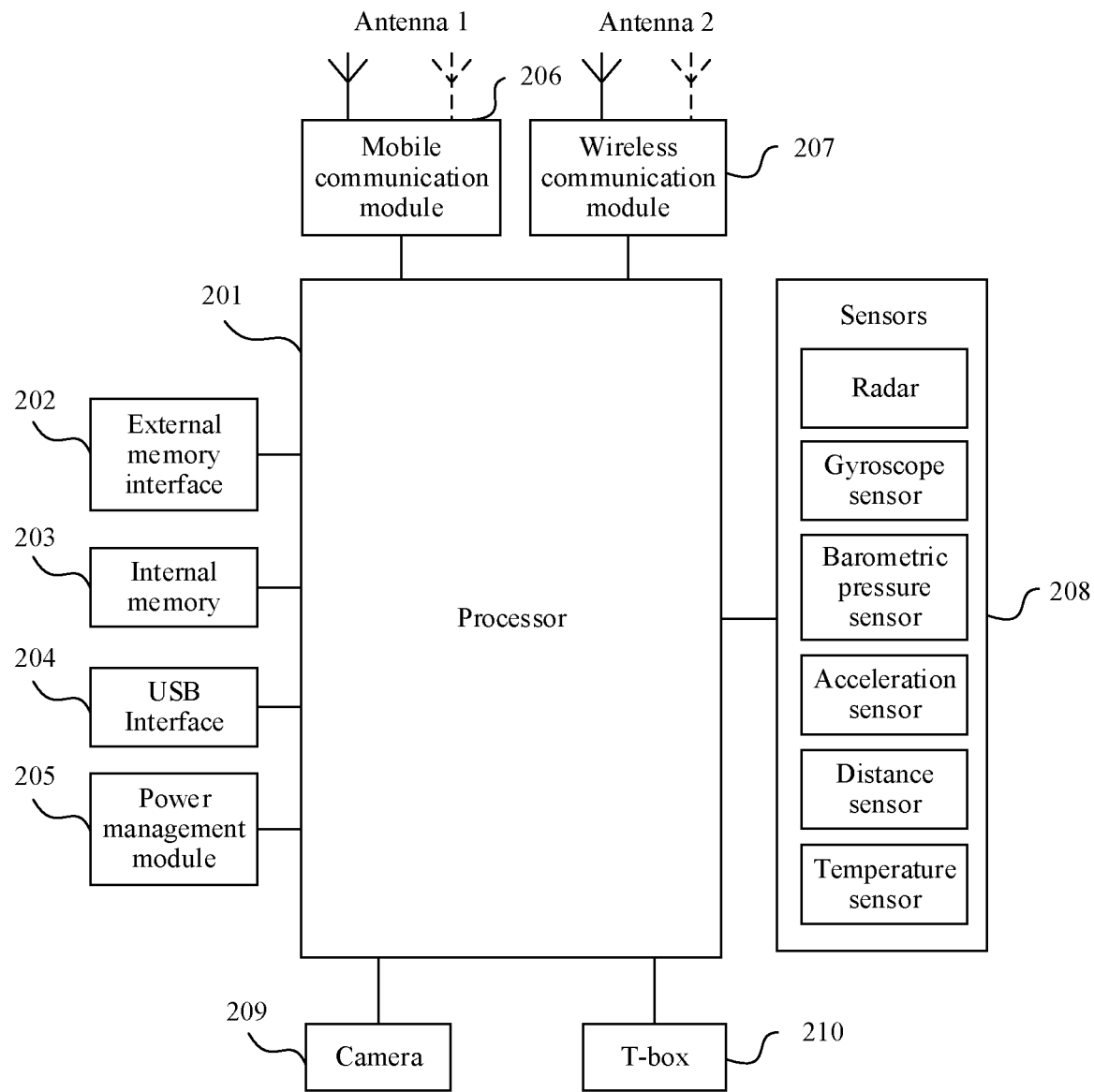
FIG. 9 is a block diagram of an autonomous vehicle according to an embodiment of the present disclosure.

FIG. 9 is a block diagram of an autonomous vehicle according to an embodiment of the present disclosure.

As shown in FIG. 9, the autonomous vehicle includes a processor 201, an external memory interface 202, an internal memory 203, a Universal Serial Bus (USB) interface 204, a power management module 205, an antenna 1, an antenna 2, a mobile communication module 206, a wireless communication module 207, a sensor 208, a camera 209, and a telematics box 210. It may be understood that a structure shown in this embodiment does not constitute a specific limitation on the autonomous vehicle.

The sensor 208 includes a radar and other sensors described in FIG. 9.

In some other embodiments of the present disclosure, the autonomous vehicle may include more or fewer components than those shown in the figure, combine some components, split some components, or have different component arrangements. The components shown in the figure may be implemented by hardware, software, or a combination of software and hardware.

The processor 201 may include one or more processing units. For example, the processor 201 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. In some embodiments, the autonomous vehicle may alternatively include one or more processors 201. The processor 201 may be a nerve center and a command center of the autonomous vehicle. The processor 201 may generate an operation control signal based on an instruction operation code and a time sequence signal, to complete control of instruction fetching and instruction execution. A memory may be further disposed in the processor 201, and is configured to store instructions and data. In some embodiments, the memory in the processor 201 is a cache.

In some embodiments, the processor 201 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, and/or a USB interface. The USB interface 211 is an interface complying with a USB standard, and may be connected to a charger to charge the autonomous vehicle.

The data processing method in this embodiment of the present disclosure may be performed by the processor 201 shown in FIG. 9, or the telematics box 210 shown in FIG. 9.

According to another aspect of embodiments of the present disclosure, an embodiment of the present disclosure further provides a data processing apparatus.

Figure 10:
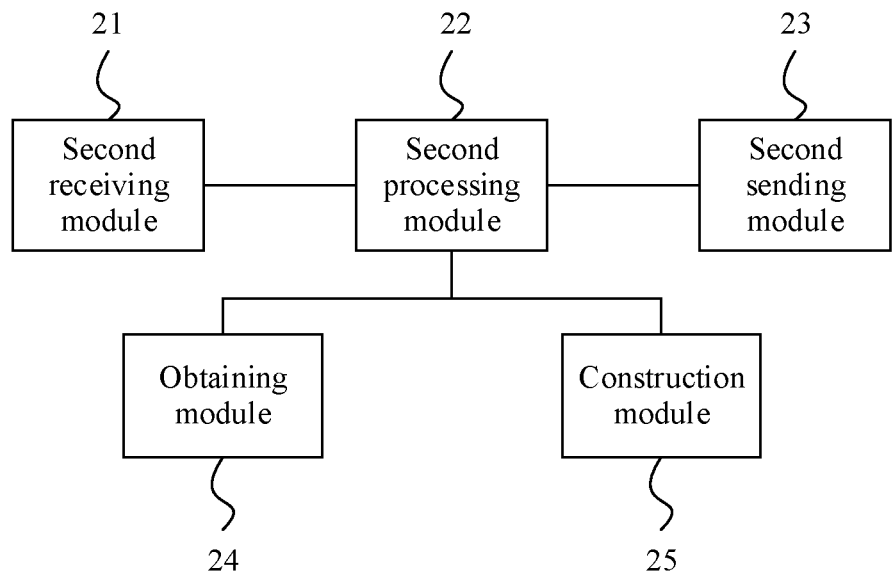
FIG. 10 is a block diagram of a data processing apparatus according to an embodiment of the present disclosure.

FIG. 10 is a block diagram of a data processing apparatus according to an embodiment of the present disclosure.

As shown in FIG. 10, the data processing apparatus includes a second receiving module 21 configured to receive a first message that is initiated by a vehicle-end device and that is used to access a roadside unit and/or used to obtain signal transmit power-related information of static roadside equipment, a second processing module 22 configured to determine a second message based on the first message and a prestored high-definition map, where the second message includes related information about accessing the roadside unit by the vehicle-end device, and/or the signal transmit power-related information of the static roadside equipment, and a second sending module 23 configured to send the second message to the vehicle-end device, so that the vehicle-end device accesses the roadside unit based on the second message, or determines a signal transmit power of the vehicle-end device based on the second message.

In some embodiments, if the second message includes the signal transmit power-related information of the static roadside equipment, the signal transmit power-related information of the static roadside equipment includes an adjustment instruction used to adjust the signal transmit power of the vehicle-end device.

In some embodiments, if the first message includes location information of the vehicle-end device, the second processing module 22 is configured to extract, from the high-definition map, attribute information of static roadside equipment corresponding to the location information of the vehicle-end device, and generate, based on the attribute information of the static roadside equipment, the second message including the adjustment instruction.

In some embodiments, the attribute information of the static roadside equipment includes a correspondence between signal coverage and a signal transmit power. The second processing module 22 is configured to, in response to a fact that the location information is in the signal coverage in the correspondence, determine, from the correspondence, a signal transmit power corresponding to the signal coverage, and generate an adjustment instruction based on the signal transmit power corresponding to the signal coverage.

With reference to FIG. 10, it can be learned that in some embodiments, the apparatus further includes an obtaining module 24 configured to obtain location information of a roadside facility, and obtain attribute information of the roadside facility, where the roadside facility includes the roadside unit and/or the static roadside equipment, and the attribute information of the roadside facility includes attribute information of the roadside unit and/or attribute information of the static roadside equipment, and a construction module 25 configured to construct the high-definition map based on the location information of the roadside facility, the attribute information of the roadside facility, and a preset vector map.

In some embodiments, the construction module 25 is further configured to add the roadside facility to the vector map in a form of a node based on the location information of the roadside facility, and store the attribute information of the roadside facility as an attribute field of the node, to generate the high-definition map.

In some embodiments, the attribute information of the roadside unit includes related information about accessing the roadside unit, and the attribute information of the static roadside equipment includes the correspondence between the signal coverage and the transmit power.

In some embodiments, the obtaining module is configured to collect point cloud information and/or video information corresponding to a road, and extract the location information from the point cloud information and/or the video information, or obtain the location information by using a surveying and mapping device.

According to another aspect of embodiments of the present disclosure, an embodiment of the present disclosure further provides a cloud server. The cloud server includes the apparatus according to any one of the foregoing embodiments.

According to another aspect of embodiments of the present disclosure, an embodiment of the present disclosure further provides an interactive system. The interactive system includes the autonomous vehicle in the foregoing embodiment and the cloud server in the foregoing embodiment.

According to another aspect of embodiments of the present disclosure, an embodiment of the present disclosure further provides an electronic device and a computer storage medium.

Figure 11:
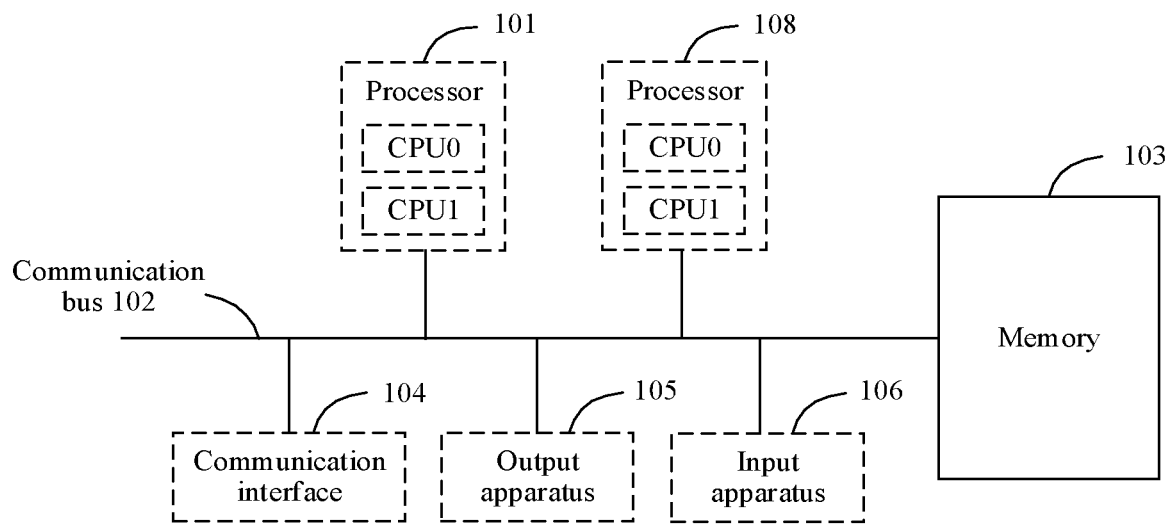
FIG. 11 is a block diagram of an electronic device according to an embodiment of the present disclosure.

FIG. 11 is a block diagram of an electronic device according to an embodiment of the present disclosure.

The electronic device is intended to represent various forms of digital computers, such as a laptop computer, a desktop computer, a workbench, a server, a blade server, a mainframe computer, and another suitable computer. The components, their connections and relationships, and their functions shown herein are merely examples and are not intended to limit the implementations of the present disclosure described and/or claimed herein.

For example, the electronic device may be a T-Box, a domain controller (DC), a multi-domain controller (MDC), an on-board unit (OBU), an internet of vehicles chip, or the like disposed on an autonomous vehicle.

The electronic device includes at least one processor 101, a communication bus 102, a memory 103, and at least one communication interface 104. The electronic device may be a general-purpose computer or server, or a dedicated computer or server.

The processor 101 may be a general-purpose central processing unit (CPU), a microprocessor, an application-specific integrated circuit (ASIC), or one or more integrated circuits configured to control execution of the solutions and procedures of the present application.

The communication bus 102 may include a path along which information is transmitted between the foregoing components.

The communication interface 104 may be any transceiver, any Internet Protocol (IP) port, any bus interface, or the like, and is configured to communicate with an internal or external device, an apparatus, or a communication network, for example, the Ethernet, a radio access network (RAN), or a wireless local area network (WLAN). For example, when the electronic device is a functional unit integrated in a vehicle, the communication interface 104 includes one or more of the following interfaces, for example, a transceiver for communication between the vehicle and an external network, and a bus interface (for example, a controller area network (CAN) bus interface) for communication between the vehicle and another internal unit of the vehicle.

The memory 103 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc (CD) ROM (CD-ROM) or another compact disc storage, an optical disc storage (including a CD, a laser disc, an optical disc, a DIGITAL VERSATILE DISC (DVD), a BLU-RAY disc, or the like), a magnetic disk storage medium or another magnetic storage device, or any other medium that can be used to carry or store expected program code in a form of instructions or a data structure and that can be accessed by a computer, but is not limited thereto. The memory may exist independently, and is connected to the processor through the bus. Alternatively, the memory may be integrated with the processor.

The memory 103 is a non-transitory computer-readable storage medium provided in the present disclosure. The memory stores instructions that can be executed by at least one processor, so that the at least one processor performs the data processing method provided in the present disclosure. The non-transitory computer-readable storage medium of the present disclosure stores computer instructions, and the computer instructions are used to enable a computer to perform the data processing method provided in the present disclosure.

As a non-transitory computer-readable storage medium, the memory 103 may be configured to store a non-transitory software program, a non-transitory computer-executable program, and a module. The processor 101 runs the non-transitory software program, the instructions, and the module that are stored in the memory 103, to execute various function applications and data processing of the server, that is, implement the data processing method in the foregoing method embodiment.

The memory 103 may include a program storage area and a data storage area. The program storage area may store an operating system, and an application for realize at least one function. The data storage area may store data created based on use of the electronic device, and the like. In addition, the memory 103 may include a high-speed RAM, and may further include a non-transitory memory, for example, at least one magnetic disk storage device, a flash memory device, or another non-transitory solid-state storage device. In some embodiments, the memory 103 optionally includes a memory that is disposed remotely relative to the processor 101, and the remote memory may be connected to the electronic device through a network. Examples of the foregoing network include but are not limited to the Internet, the Internet of vehicles, an intranet, a local area network, a mobile communication network, and a combination thereof.

During specific implementation, in an embodiment, the processor 101 may include one or more CPUs such as a CPU0 and a CPU1 shown in FIG. 11.

During specific implementation, in an embodiment, the electronic device may include a plurality of processors, for example, the processor 101 and a processor 108 in FIG. 11. Each of the processors may be a single-core processor (single-CPU) or a multi-core processor (multi-CPU). Herein, the processor may be one or more devices, circuits, and/or processing cores configured to process data (for example, computer program instructions).

During specific implementation, in an embodiment, the electronic device may further include an output apparatus 105 and an input apparatus 106. The output apparatus 105 communicates with the processor 101, and may display information in a plurality of manners. For example, the output apparatus 105 may be a liquid-crystal display (LCD), a light-emitting diode (LED) display apparatus, a cathode-ray tube (CRT) display apparatus, a projector, or the like. The input apparatus 106 communicates with the processor 101, and may receive an input from a user in a plurality of manners. For example, the input apparatus 106 may be a mouse, a keyboard, a touchscreen apparatus, a sensor apparatus, or the like.

When the electronic device shown in FIG. 11 is a chip, a function/implementation process of the communication interface 104 may alternatively be implemented by using a pin, a circuit, or the like. The memory is a storage unit in the chip, for example, a register or a cache. The storage unit may alternatively be a storage unit outside the chip.

It should be understood that various forms of procedures shown above can be used to reorder, add, or delete steps. For example, the steps described in the present disclosure may be performed in parallel, may be performed in sequence, or may be performed in different sequences, provided that an expected result of the technical solutions of the present disclosure can be achieved. This is not limited herein.

The foregoing specific implementations do not constitute any limitation on the protection scope of the present disclosure. A person skilled in the art should understand that various modifications, combinations, sub-combinations, and substitutions may be made according to design requirements and other factors. Any modification, equivalent replacement, and improvement made without departing from the principle of the present disclosure shall fall within the protection scope of the present disclosure.

What is claimed is:

1. A device comprising:
at least one memory configured to store instructions; and
at least one processor coupled to the memory and configured to execute the instructions to cause the device to:
send, to a cloud server coupled to the device via a communication link, a first message requesting to access a roadside device and to obtain signal transmit power-related information of static roadside equipment;
receive, from the cloud server, a second message that is based on the first message and on a prestored high-definition map, wherein the second message comprises information regarding accessing the roadside device and the signal transmit power-related information; and
determine, based on the second message, a first signal transmit power of the device.

2. The device of claim 1, wherein the signal transmit power-related information comprises an adjustment instruction for adjusting the first signal transmit power.

3. The device of claim 1, wherein the at least one processor is further configured to execute the instructions to cause the vehicle end device to:
receive, from the cloud server, the prestored high-definition map; and
adjust, based on the prestored high-definition map, the first signal transmit power.

4. The device of claim 3, wherein the at least one processor is further configured to execute the instructions to cause the device to:
extract, from the prestored high-definition map, attribute information of the static roadside equipment corresponding to location information of the device; and
further adjust, based on the attribute information, the first signal transmit power.

5. The device of claim 4, wherein the attribute information comprises a correspondence between a signal coverage and a second signal transmit power, and wherein the at least one processor is further configured to execute the instructions to cause the device to:
make a determination that a location indicated by the location information is in the signal coverage;
determine, in response to the determination and from the correspondence, a second signal transmit power corresponding to the signal coverage; and
further adjust, based on the second signal transmit power, the first signal transmit power.

6. A device comprising:
at least one memory configured to store instructions; and
at least one processor coupled to the memory and configured to execute the instructions to cause the device to:
send, to a cloud server coupled to the device via a communication link, a first message to access a roadside device;
receive, from the cloud server, a second message that is based on the first message and on a prestored high-definition map, wherein the second message comprises information about accessing the roadside device by the device; and
access the roadside device based on the second message.

7. A cloud server comprising:
at least one memory configured to store instructions; and
at least one processor coupled to the memory and configured to execute the instructions to cause the apparatus to:
receive, from a device coupled to the cloud server via a communication link, a first message requesting to access a roadside device and to obtain signal transmit power-related information of a static roadside equipment;
generate, based on the first message and a prestored high-definition map, a second message comprising information regarding accessing the roadside device and the signal transmit power-related information; and
send the second message to the device.

8. The cloud server of claim 7, wherein the signal transmit power-related information comprises an adjustment instruction for adjusting a first signal transmit power of the device.

9. The cloud server of claim 8, wherein the first message comprises location information of the device, and wherein the at least one processor is further configured to execute the instructions to cause the apparatus to:
extract, from the prestored high-definition map, attribute information of the static roadside equipment corresponding to the location information; and
further generate, based on the attribute information, the second message comprising the adjustment instruction.

10. The cloud server of claim 9, wherein the attribute information comprises a correspondence between a signal coverage and a second signal transmit power, and wherein the at least one processor is further configured to execute the instructions to cause the apparatus to:
make a determination that a location indicated by the location information is in the signal coverage;
determine, in response to the determination and from the correspondence, the second signal transmit power corresponding to the signal coverage; and
generate, based on the second signal transmit power, the adjustment instruction.

11. The cloud server of claim 7, wherein the at least one processor is further configured to execute the instructions to cause the apparatus to:
obtain location information of a roadside facility, wherein the roadside facility comprises a roadside device or the static roadside equipment;
obtain first attribute information of the roadside facility, wherein the first attribute information comprises second attribute information of the roadside device or third attribute information of the static roadside equipment; and
construct the prestored high-definition map based on the location information, the first attribute information, and a preset vector map.

12. The cloud server of claim 11, wherein the at least one processor is further configured to execute the instructions to cause the apparatus to:
add the roadside facility to the vector map as a node based on the location information; and store the first attribute information as an attribute field of the node suitable for generating the prestored high-definition map.

13. The cloud server of claim 11, wherein the second attribute information-comprises information for accessing the roadside device, and wherein the third attribute information comprises a correspondence between a signal coverage and a second signal transmit power.

14. The cloud server of claim 11, wherein the at least one processor is further configured to execute the instructions to cause the apparatus to:
collect point cloud information or video information corresponding to a road, and extract the location information from the point cloud information or the video information; or
obtain the location information using a surveying and mapping device.

15. A cloud server comprising:
at least one memory configured to store instructions; and
at least one processor coupled to the memory and configured to execute the instructions to cause the cloud server to:
receive, from a device coupled to the cloud server via a communication link, a first message requesting to access a roadside device;
generate, based on the first message and a prestored high-definition map, a second message comprising information regarding accessing the roadside device by the device, wherein the second message is configured to enable the device to access the roadside device; and
send the second message to the device.

16. The cloud server of claim 15, wherein the at least one processor is further configured to execute the instructions to cause the cloud server to:
obtain location information of a roadside facility, wherein the roadside facility comprises the roadside device or the static roadside equipment;
obtain first attribute information of the roadside facility, wherein the first attribute information comprises second attribute information of the roadside device and third attribute information of the static roadside equipment; and
construct the prestored high-definition map based on the location information, the first attribute information, and a preset vector map.

17. The cloud server of claim 16, wherein the at least one processor is further configured to execute the instructions to cause the cloud server to:
add the roadside facility to the vector map as a node based on the location information; and
store the first attribute information as an attribute field of the node to generate the prestored high-definition map.

18. The cloud server of claim 16, wherein the second attribute information comprises information about accessing the roadside device, and wherein the third attribute information comprises a correspondence between a signal coverage and a signal transmit power.

19. The cloud server of claim 16, wherein the at least one processor is further configured to execute the instructions to cause the cloud server to:
collect point cloud information or video information corresponding to a road; and
extract the location information from the point cloud information or the video information.

20. The cloud server of claim 16, wherein the at least one processor is further configured to execute the instructions to cause the cloud server to obtain the location information using a surveying and mapping device.

* * * * *